(12) United States Patent
Wohlfeld

(10) Patent No.: US 11,080,872 B2
(45) Date of Patent: *Aug. 3, 2021

(54) DEVICE AND METHOD FOR INDOOR MOBILE MAPPING OF AN ENVIRONMENT

(71) Applicant: FARO Technologies, Inc., Lake Mary, FL (US)

(72) Inventor: Denis Wohlfeld, Ludwigsburg (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/847,123

(22) Filed: Apr. 13, 2020

(65) Prior Publication Data

US 2020/0250843 A1  Aug. 6, 2020

Related U.S. Application Data

(63) Continuation of application No. 16/414,909, filed on May 17, 2019, now Pat. No. 10,726,566, which is a
(Continued)

(51) Int. Cl.
  *G06T 7/33* (2017.01)
  *G01S 5/16* (2006.01)
  (Continued)

(52) U.S. Cl.
  CPC .............. *G06T 7/344* (2017.01); *G01S 5/16* (2013.01); *G01S 7/4812* (2013.01);
  (Continued)

(58) Field of Classification Search
  CPC .................................. G06T 7/344; G06T 7/55
  See application file for complete search history.

(56) References Cited

U.S. PATENT DOCUMENTS 6,246,468 B1  6/2001  Dimsdale
6,542,249 B1  4/2003  Kofman et al.
(Continued)

FOREIGN PATENT DOCUMENTS

DE  102009035336 A1  11/2010
DE  102012109481 A1  4/2014
(Continued)

OTHER PUBLICATIONS

Brenneke et al: "Using 3D laser range data for slam in outdoor enviornments." Proceedings of the 2003 IEEE/RSJ International Conference on Intelligent Robots and Systems. Las Vegas, NV Oct. 27-31, 2003; IEEE US, vol. 1, Oct. 27, 2003, pp. 188-193.
(Continued)

*Primary Examiner* — Girumsew Wendmagegn
(74) *Attorney, Agent, or Firm* — Cantor Colburn LLP

(57) ABSTRACT

A method and system for scanning and measuring an environment is provided. The method includes acquiring a first group of 3D coordinates of the area with a first 3D measurement device. The first 3D measurement device determines a distance to a surface in the area based at least in part on the speed of light. A second group of coordinates is acquired with a second measurement device while the first 3D measurement device is moved through the environment. The second measurement device being in a fixed relationship to the first 3D measurement device. The second measurement device determining a position of the second measurement device based on one or more points on the surface in the area based at least in part on a projected light. The first group of 3D coordinates is registered based at least in part the second group of coordinates.

16 Claims, 11 Drawing Sheets

Related U.S. Application Data continuation of application No. 15/666,088, filed on Aug. 1, 2017, now Pat. No. 10,380,749.

(60) Provisional application No. 62/399,613, filed on Sep. 26, 2016.

(51) Int. Cl.

| | | |
|---|---|---|
| *G06T 7/521* | (2017.01) | |
| *G06T 7/70* | (2017.01) | |
| *G06T 7/73* | (2017.01) | |
| *H04N 13/25* | (2018.01) | |
| *G06T 7/55* | (2017.01) | |
| *G06T 7/579* | (2017.01) | |
| *G01S 17/87* | (2020.01) | |
| *G01S 17/89* | (2020.01) | |
| *G01S 17/42* | (2006.01) | |
| *G01S 17/48* | (2006.01) | |
| *G01S 7/481* | (2006.01) | |
| *G01S 7/497* | (2006.01) | |
| *G01S 17/86* | (2020.01) | |
| *H04N 13/254* | (2018.01) | |

(52) U.S. Cl.
CPC .......... *G01S 7/4813* (2013.01); *G01S 7/4817* (2013.01); *G01S 7/497* (2013.01); *G01S 17/42* (2013.01); *G01S 17/48* (2013.01); *G01S 17/86* (2020.01); *G01S 17/87* (2013.01); *G01S 17/89* (2013.01); *G06T 7/521* (2017.01); *G06T 7/55* (2017.01); *G06T 7/579* (2017.01); *G06T 7/70* (2017.01); *G06T 7/73* (2017.01); *H04N 13/25* (2018.05); *G06T 2207/10016* (2013.01); *G06T 2207/10024* (2013.01); *G06T 2207/10028* (2013.01); *G06T 2207/10048* (2013.01); *G06T 2207/10152* (2013.01); *G06T 2207/30244* (2013.01); *H04N 13/254* (2018.05)

(56) References Cited

U.S. PATENT DOCUMENTS

| | | |
|---|---|---|
| 7,069,124 B1 | 6/2006 | Whittaker et al. |
| 8,384,914 B2 | 2/2013 | Becker et al. |
| 8,625,106 B2 | 1/2014 | Ossig et al. |
| 8,699,007 B2 | 4/2014 | Becker et al. |
| 8,699,036 B2 | 4/2014 | Ditte et al. |
| 8,705,012 B2 | 4/2014 | Greiner et al. |
| 8,705,016 B2 | 4/2014 | Schumann et al. |
| 8,730,477 B2 | 5/2014 | Ruhland et al. |
| 8,811,767 B2 | 8/2014 | Veeraraghaven et al. |
| 8,830,485 B2 | 9/2014 | Woloschyn |
| 8,896,819 B2 | 11/2014 | Schumann et al. |
| 8,970,823 B2 | 3/2015 | Heidemann et al. |
| 9,074,883 B2 | 7/2015 | Schumann et al. |
| 9,279,662 B2 | 3/2016 | Steffey et al. |
| 9,329,271 B2 | 5/2016 | Ossig et al. |
| 9,342,890 B2 | 5/2016 | Becker et al. |
| 9,372,265 B2 | 6/2016 | Zweigle et al. |
| 9,417,056 B2 | 8/2016 | Neundorf et al. |
| 9,417,316 B2 | 8/2016 | Schumann et al. |
| 9,513,107 B2 | 12/2016 | Zweigle et al. |
| 9,599,455 B2 | 3/2017 | Heidemann et al. |
| 9,618,620 B2 | 4/2017 | Zweigle et al. |
| 9,739,886 B2 | 8/2017 | Zweigle et al. |
| 9,746,559 B2 | 8/2017 | Zweigle et al. |
| 10,280,749 B2 | 5/2019 | Chen et al. |
| 10,380,749 B2 * | 8/2019 | Wohlfeld .................. G06T 7/55 |
| 10,726,566 B2 * | 7/2020 | Wohlfeld ............... H04N 13/25 |
| 2004/0027347 A1 | 2/2004 | Farsaie |
| 2006/0110026 A1 | 5/2006 | Strassenburg-Kleciak |
| 2009/0323121 A1 | 12/2009 | Valkenburg et al. |
| 2010/0134596 A1 | 6/2010 | Becker |
| 2011/0288684 A1 | 11/2011 | Farlow et al. |
| 2012/0069352 A1 | 3/2012 | Ossig et al. |
| 2014/0063489 A1 | 3/2014 | Steffey et al. |
| 2014/0078519 A1 | 3/2014 | Steffey et al. |
| 2014/0226190 A1 | 8/2014 | Bridges et al. |
| 2014/0240690 A1 | 8/2014 | Newman et al. |
| 2014/0300906 A1 | 10/2014 | Becker et al. |
| 2014/0362424 A1 | 12/2014 | Bridges et al. |
| 2015/0085068 A1 | 3/2015 | Becker et al. |
| 2015/0085301 A1 | 3/2015 | Becker et al. |
| 2015/0160342 A1 | 6/2015 | Zweigle et al. |
| 2015/0160347 A1 | 6/2015 | Zweigle et al. |
| 2016/0047914 A1 | 2/2016 | Zweigle et al. |
| 2018/0089846 A1 | 3/2018 | Wohlfeld |
| 2019/0304109 A1 | 10/2019 | Wohlfeld |

FOREIGN PATENT DOCUMENTS

| | | |
|---|---|---|
| WO | 2013103725 A1 | 7/2013 |
| WO | 2014128498 A2 | 8/2014 |

OTHER PUBLICATIONS

Davidson, A. et al., "MonoSLAM: Real-Time Single Camera Slam", IEEE Transactions on Pattern Analysis and Machine Intelligence, vol. 29, No. 6, Jun. 1, 2007, pp. 1052-1067, XP011179664.

Gebre, Biruk A., et al., "Remotely Operated and Autonomous Mapping System (ROAMS)", Technologies for Practical Robot Applications, TEPRA 2009, IEEE International Conference on Nov. 9, 2009, pp. 173-178, XP031570394.

Harrison A. et al., "High Quality 3D Laser Ranging Under General Vehicle Motion", 2008 IEEE International Conference on Robotics and Automation, May 19-23, 2008, pp. 7-12, XP031340123.

May, S. et al, "Robust 3D-Mapping with Time-of-Flight Cameras", Intelligent Robots and Systems, IROS 2009, IEEE/RSJ International Conference on Oct. 10, 2009, pp. 1673-1678, XP031581042.

Ohno, K. et al., "Real-Time Robot Trajectory Estimation and 3D Map Construction Using 3D Camera", Intelligent Robots and Systems, 2006 IEEE/RSJ International Conference on Oct. 1, 2006, pp. 5279-5285, XP031006974.

Surmann, H. et al., "An Autonomous Mobile Robot with a 3D Laser Range Finder for 3D Exploration and Digitalization of Indoor Environments", Robotics and Autonomous Systems, Elsevier Science Publishers, vol. 45, No. 3-4, Dec. 31, 2003, pp. 181-198.

Yan, R., et al, "3D Point Cloud Map Construction Based on Line Segments with Two Mutually Perpendicular Laser Sensors", 2013 13th International Conference on Control, Automation and Systems (ICCAS 2013), IEEE, Oct. 20, 2013, pgs. 1114-1116.

Ye, C. et al., "Characterization of a 2-D Laser Scanner for Mobile Robot Obstacle Negotiation" Proceedings/2002 IEEE International Conference on Robotics and Automation, May 11-15, 2002, Washington, D.C., May 1, 2002, pp. 2512-2518, XP009169742.

\* cited by examiner

DEVICE AND METHOD FOR INDOOR MOBILE MAPPING OF AN ENVIRONMENT

CROSS REFERENCE TO RELATED APPLICATION

This present application is a continuation application of U.S. patent application Ser. No. 16/414,909 filed on May 17, 2019, which is a continuation application of U.S. patent application Ser. No. 15/666,088 filed Aug. 1, 2017, which claims the benefit of U.S. Provisional Application Ser. No. 62/399,613, filed Sep. 26, 2016, the entire disclosure of which is incorporated herein by reference.

BACKGROUND

The subject matter disclosed herein relates to a mobile or portable indoor mapping system, and in particular, to a system that can quickly and accurately generate three-dimensional coordinates of an indoor area.

The creation of three-dimensional (3D) computer models of existing structures has a number of uses in architecture, construction, archeology, and reconstruction applications. One method of generating the 3D computer model is using a laser scanner device. A laser scanner emits a beam of light and determines the 3D coordinates to a surface that reflects the light. The determination of the distance may be based on the time-of-flight of the light beam. Some laser scanner devices use a rotating mirror to reflect the light into the environment. The rotating mirror is rotated slowly about a second axis to obtain 3D coordinates in a spherical or semi-spherical area about the laser scanner.

Since the area typically being modeled may be large, multiple scans may need to be performed in order for all of the surfaces in the environment to be measured. The individual scans need to be registered to each other so that the acquired 3D coordinates may be defined in a common coordinate reference frame. To register the scans, the operator may place registration targets, typically reflective spherical targets, where the registration targets may be scanned from multiple locations. Since the targets are located in multiple scans, the operator may use these targets for registration.

Some systems have been developed with the laser scanner is places on a mobile system such as a cart. The laser scanner may then be rolled or otherwise carried about the area being scanned. To register the scans, the system may include inertial measurement units, such as gyroscopes and accelerometers to track the position where the scans are performed for purposes of registration. While the inertial measurement units will track the location of the system, these systems tend to drift as the mobile system is moved resulting in errors in the measurements. Further, these systems assume that the floor is level and the laser tracker maintains its alignment.

Accordingly, while existing indoor mapping systems are suitable for their intended purpose the need for improvement remains, particularly in providing an indoor mapping system that tracks the locations where scanning is performed without using artificial targets and with six-degrees of freedom.

BRIEF SUMMARY

According to embodiments of the invention, a method and system for scanning and measuring an environment is provided. The method includes acquiring a first group of 3D coordinates of the area with a first 3D measurement device operating while moving the first 3D measurement device through the environment. The first three-dimensional (3D) measurement device determines a distance to a surface in the area based at least in part on the speed of light. A second group of coordinates is acquired of at least a portion of the area with a second measurement device while the first 3D measurement device is moved through the environment. The second measurement device being operably coupled in a fixed relationship to the first 3D measurement device. The second measurement device being operable to determine a position of the second measurement device based on one or more points on the surface in the area based at least in part on a projected light. The first group of 3D coordinates are registered based at least in part the second group of coordinates.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

In one embodiment, a portable or mobile indoor mapping system is provided that generates three-dimensional coordinates of points on surfaces of an indoor area. In an embodiment, advantages are provided in the measuring of the position and orientation of the system with six-degrees of freedom as the mobile indoor mapping system is moved from a first position to a second position. In an embodiment, advantages are provided in using the position and orientation of the mobile indoor mapping system to register three-dimensional coordinate data of the indoor area.

Figure 1:
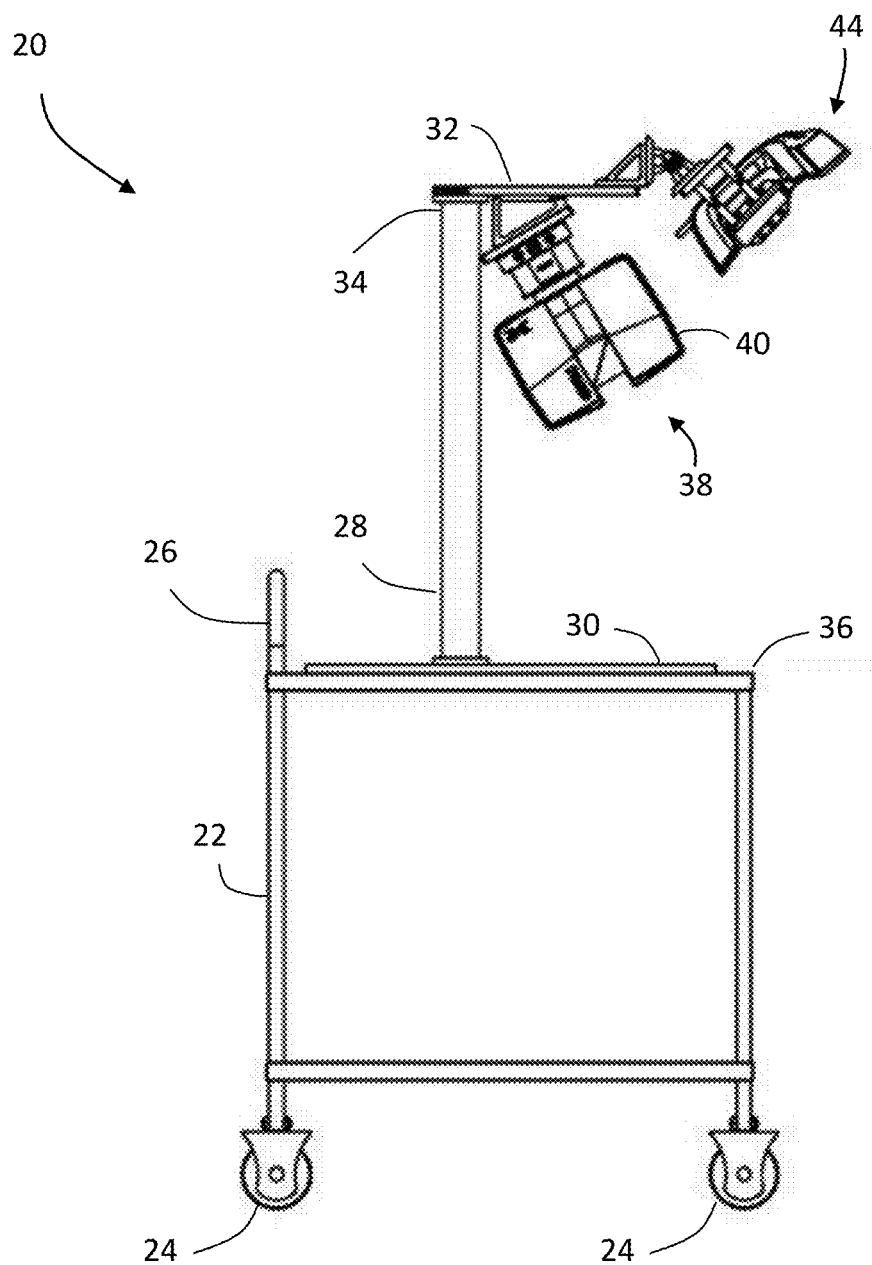
FIG. 1 shows a side view of a mobile indoor mapping system in accordance with an embodiment.

Referring now to FIG. 1, an embodiment is shown of an indoor mapping system 20. In the exemplary embodiment, the system 20 includes a mobile platform 22 that allows the system 20 to be moved about the indoor area where mapping is desired. The mobile platform 22 may include wheels 24 that allow the mobile platform to be rolled over the floor in the area being scanned, such as by an operator (not shown) pushing on a handle 26. It should be appreciated that while embodiments herein refer to the mobile platform 22 as having wheels and is rolled, this is for exemplary purposes and the claimed invention should not be so limited. In other embodiments, the mobile platform 22 may be transported using other means, such as carried by the operator in a backpack for example.

Figure 2:
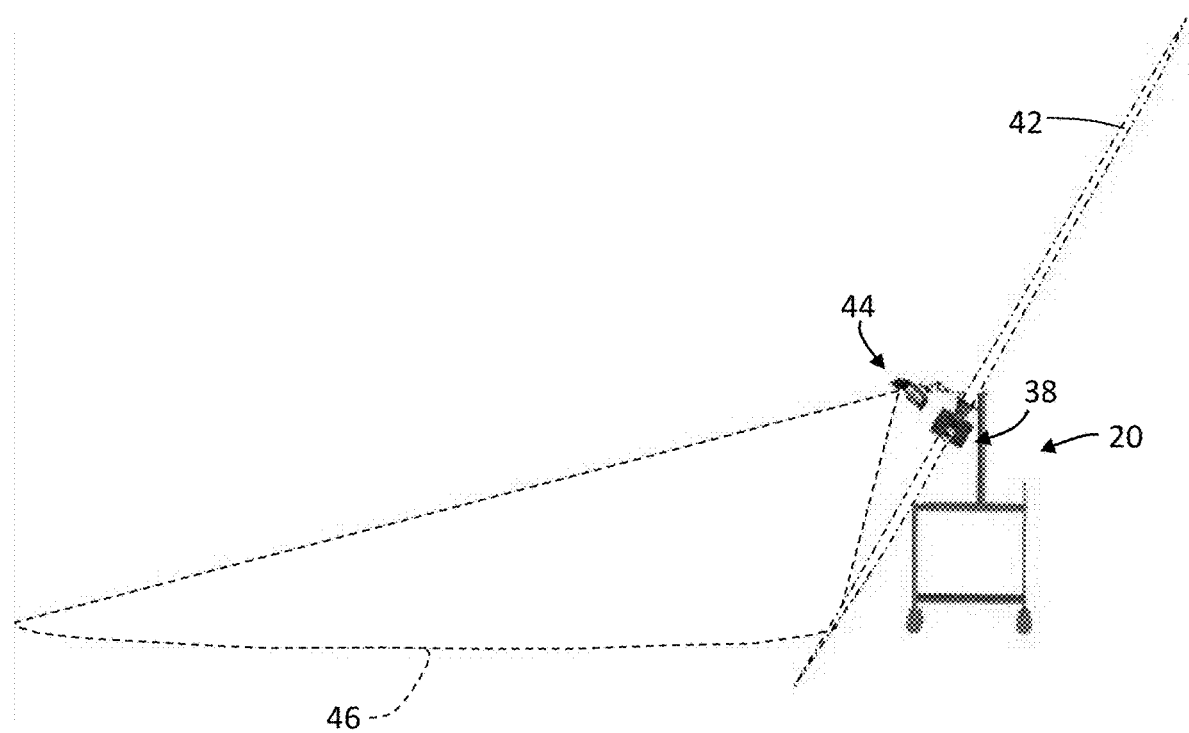
FIG. 2 shows another side view of the system of FIG. 1 in operation.

The mobile platform 22 includes a pedestal 28 that extends from a top surface 30. An arm 32 extends from the top 34 of the pedestal 28 towards a front or leading edge 36 of the top surface 30. In the exemplary embodiment, the system 20 includes a first three-dimensional (3D) measurement device, such as a laser scanner 38. As will be discussed in more detail below, the laser scanner 38 projects beams of light that are sequentially emitted in a plane 42 (FIG. 2). The laser scanner receives reflections of the emitted light and a distance is determined from the laser scanner 38 to the point of reflection on a surface in the environment. The laser scanner 38 has two modes of operation, a helical scan mode and a compound scan mode. In the helical scan mode, the emitted light is projected in a plane 42 that remains substantially fixed relative to the laser scanner 38 housing 40. In a compound scan mode, the emitted light is projected in a plane 42 that rotates about an axis extending through the base of the laser scanner 38. In an embodiment, a mirror that rotates about a first axis defines the plane in which the emitted light is projected.

In an embodiment, laser scanner 38 is oriented and positioned on an angle relative to the top surface 30 such that the plane 42 extends past the leading edge 36 of the top surface 30. In other words, the laser scanner 38 is oriented and positioned such that surfaces in front of the mobile platform 22 may be scanned and 3D coordinates acquired of the surface.

Also coupled to the arm 32 is a second 3D measurement device, such as a triangulation 3D imager 44. As will be discussed in more detail herein, an 3D imager is a device having a projector and an image capture device (e.g. a camera). The projector is configured to project a pattern of light onto the surface. In an embodiment, the pattern is a coded structured light composed of elements. The projector and camera are arranged in a predetermined geometric configuration that allows in some instances for the distance to the surface to be determined using trigonometric principles and epipolar geometry. The pattern of light is projected over an area, allowing in some instances for the 3D coordinates of multiple points to be determined simultaneously. It should be appreciated that while embodiments herein describe the second 3D measurement device as being a 3D imager, other types of coordinate measurement devices may be used, such as but not limited to a time of flight scanner for example.

Figure 3:
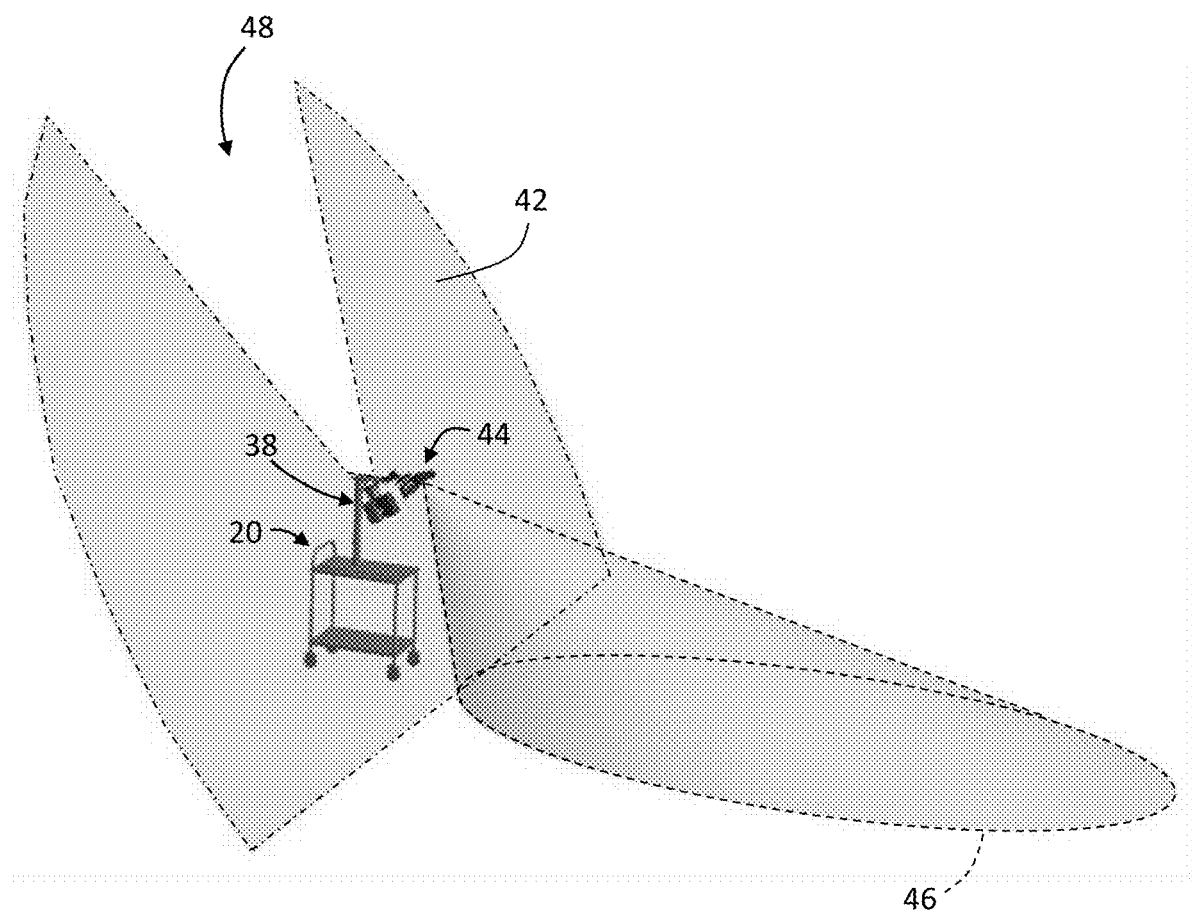
FIG. 3 shows a perspective view of system of FIG. 1 in operation.

In an embodiment, the 3D imager 44 is mounted to the end of the arm 32. This positioning allows the 3D imager 44 to project the pattern of light onto an area 46 (FIG. 3). In an embodiment, the camera is configured to have a field of view that encompasses the area 46. As will be discussed in more detail below, since the geometric relationship between the 3D imager 44 and the mobile platform 22 is fixed, the position and orientation of the mobile platform 22 may be determined with six-degrees of freedom (6DOF). This provides advantages in determining the position and orientation of the laser scanner 38 during the scanning process that results in improved registration of the 3D coordinate data.

Figure 4:
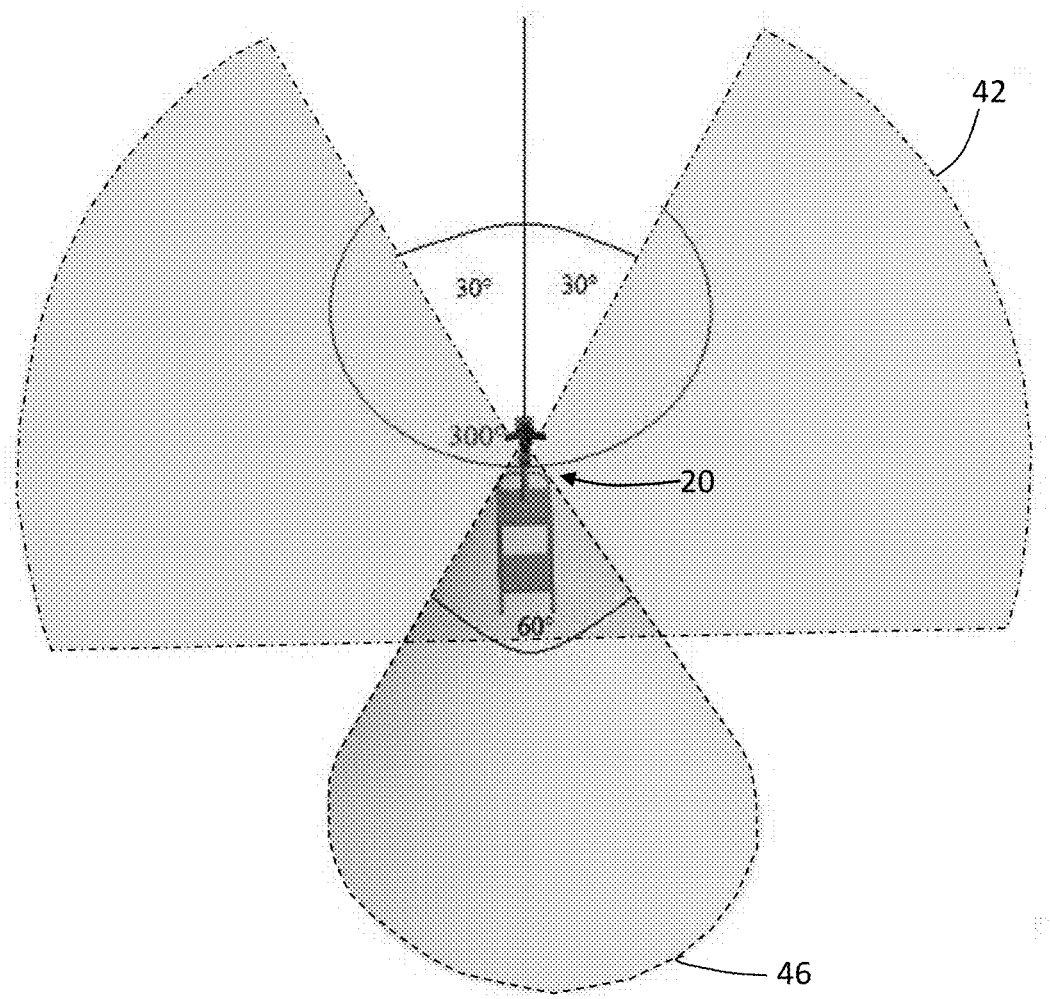
FIG. 4 shows a front view of the system of FIG. 1 in operation.

Referring now to FIG. 2-FIG. 4, embodiments are shown of the areas 42, 46 scanned by the laser scanner 38 and 3D imager 44. In an embodiment, the plane 42 is interrupted by an area 48. The area 48 is shadowed by the base 50 (FIG. 5) of the laser scanner 38. In an embodiment, the area 48 is 60 degree area that results in a 300 degree scanning area. During the compound mode of operation, the housing 40 is rotated about an axis 52 (FIG. 5) which causes the plane 42 to rotate about the axis 52. Once the housing 40 has been rotated 180 degrees, 3D coordinates in a semi-spherical area about the laser scanner 38 have been acquired. In one embodiment, the field of view of the area 46 is 60 degrees.

Figure 5:
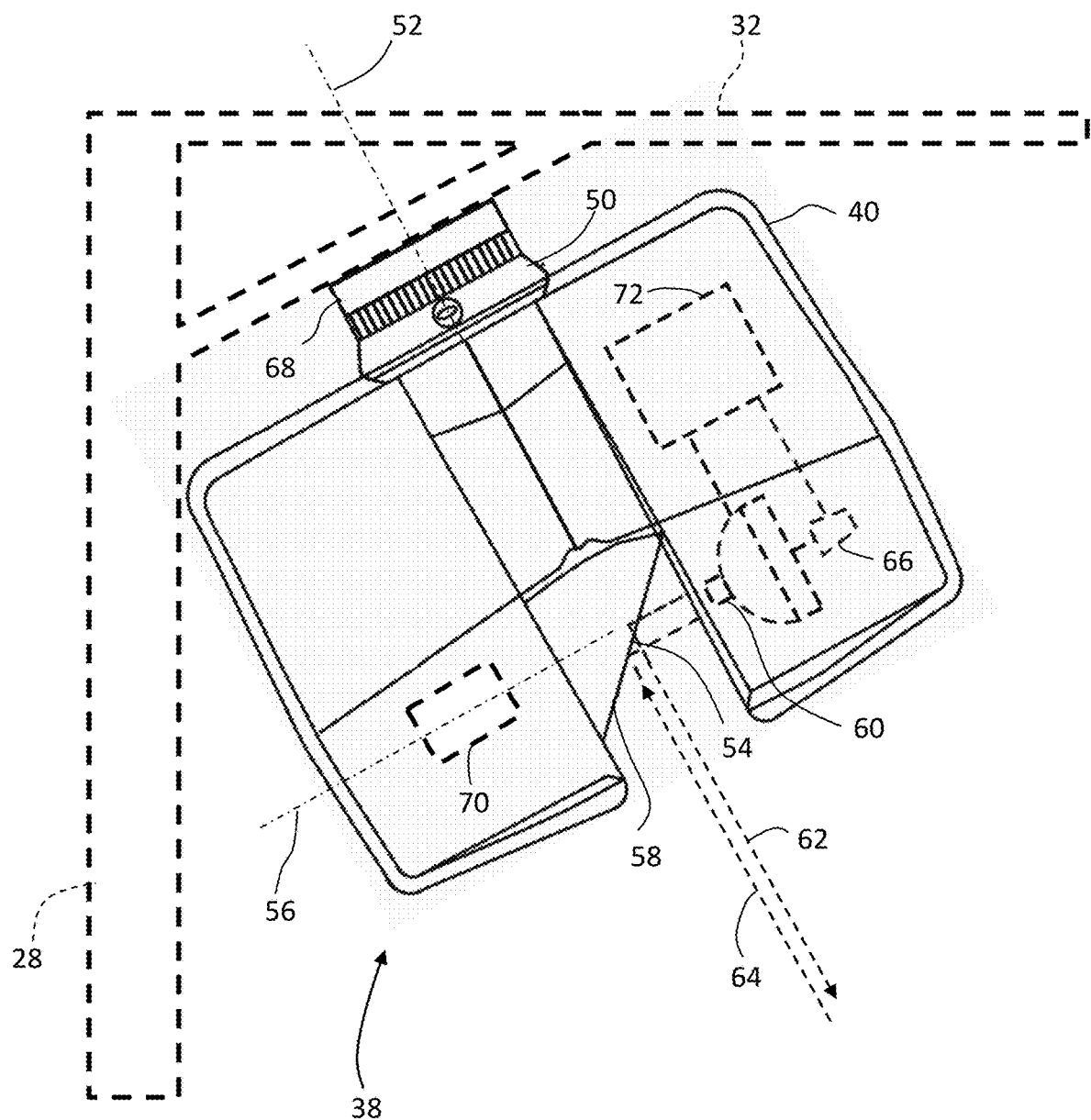
FIG. 5 shows a side view of a laser scanning portion of the system of FIG. 1 in accordance with an embodiment.

Referring now to FIG. 5, an embodiment of the laser scanner 38 is shown optically scanning and measuring the environment surrounding the system 20. In an embodiment, the laser scanner 38 has a measuring head or housing 40 and a base 50. The housing 40 is mounted on the base 50 such that the laser scanner 38 may be rotated about the axis 52. In one embodiment, the measuring head 22 includes a gimbal point 54 that is a center of rotation first about the axis 52 and a second axis 56. The housing 40 may include a rotary mirror 58 that rotates about the axis 56. The first axis extends through the center of the base 50. In the illustrated embodiment, the axis 52, 56 intersect at the gimbal point 54.

The housing 40 further includes an electromagnetic radiation emitter, such as light emitter 60 for example, that emits a light beam 62. In an embodiment, the emitted light beam 62 is a laser beam for example. The laser beam may have a wavelength range of approximately 300 to 1600 nanometers, such as 790 nanometers, 905 nanometers, 1550 nanometers or less than 400 nanometers for example. It should be appreciated that other electromagnetic radiation beams having greater or smaller wavelengths may also be used. The emitted light beam 62 may amplitude or intensity modulated, for example, with a sinusoid or rectangular waveform. The emitted light beam 62 is emitted by the light emitter 60 onto the rotary mirror 26, where it is deflected into the area of the environment adjacent the laser scanner 38. A reflected light beam 64 is reflected by a surface in the area of the environment being scanned. The reflected or scattered light is intercepted by the rotary mirror 58 and directed onto a light receiver 66. The directions of the emitted light beam 62 and the reflected light beam 64 result from the angular positions of the rotary mirror about axis 56 and the housing 40 about the axis 52. These angular positions in turn depend on rotary drives, such as motor 68 and motor 70 for example. Each axis 52, 56 includes at least one angular transducer for measuring the angle of rotation. In an embodiment, the angular transducer is an angular encoder.

Coupled to the light emitter 60 and the light receiver 66 is a controller 72. The controller 72 determines, for a multitude of surface points, a corresponding number of distances between the laser scanner 38 and the surface points of objects (e.g. walls, the floor, columns, etc) in the area of the environment being scanned. The distance to a particular surface point is determined based at least in part on the speed of light in air through which electromagnetic radiation propagates from the laser scanner 38 to the surface point. In one embodiment, the phase shift between the laser scanner 38 and the surface point is determined an evaluated to obtain a measured distance. In another embodiment, the elapsed time between laser pulses is measured directly to determine a measured distance.

The speed of light in air depends on the properties of the air such as the air temperature, barometric pressure, relative humidity, and concentration of carbon dioxide. Such air properties influence the index of refraction n of the air. The speed of light in air is equal to the speed of light in vacuum c divided by the index of refraction. In other words, $c_{air}=c/n$. A laser scanner of the type discussed herein is based on the time-of-flight of the light in the air (the round-trip time for the light to travel from the device to the object and back to the device). A method of measuring distance based on the time-of-flight of light (or any type of electromagnetic radiation) depends on the speed of light in air and is therefore easily distinguished from methods of measuring distance based on triangulation.

In the compound mode of operation, the scanning of the volume about the laser scanner 38 takes place by quickly rotating the rotary mirror 58 about axis 56 while slowly rotating the housing 40 about axis 52, thereby moving the assembly in a spiral pattern. For such a scanning system, the gimbal point 54 defines the origin of the local stationary reference system. The base 50 rests in a local stationary frame of reference.

In a helical mode of operation, the scanning occurs in a plane that is fixed relative to the laser scanner 38. In this mode, the laser scanner quickly rotates the rotary mirror about the axis 56 and the housing remains in a fixed location relative to the axis 52. As will be discussed in more detail below, when the mobile platform is moved and the laser scanner 38 is operated in a helical mode, 3D coordinates of surfaces in the area of the environment being scanned define a helical pattern. In an embodiment, when the laser scanner 38 is in helical mode, the housing 40 is aligned in the direction of travel (i.e. aligned front to rear with the mobile platform 22) to generate the plane 42 oriented as shown in FIGS. 2-4.

Figures 6, 11:
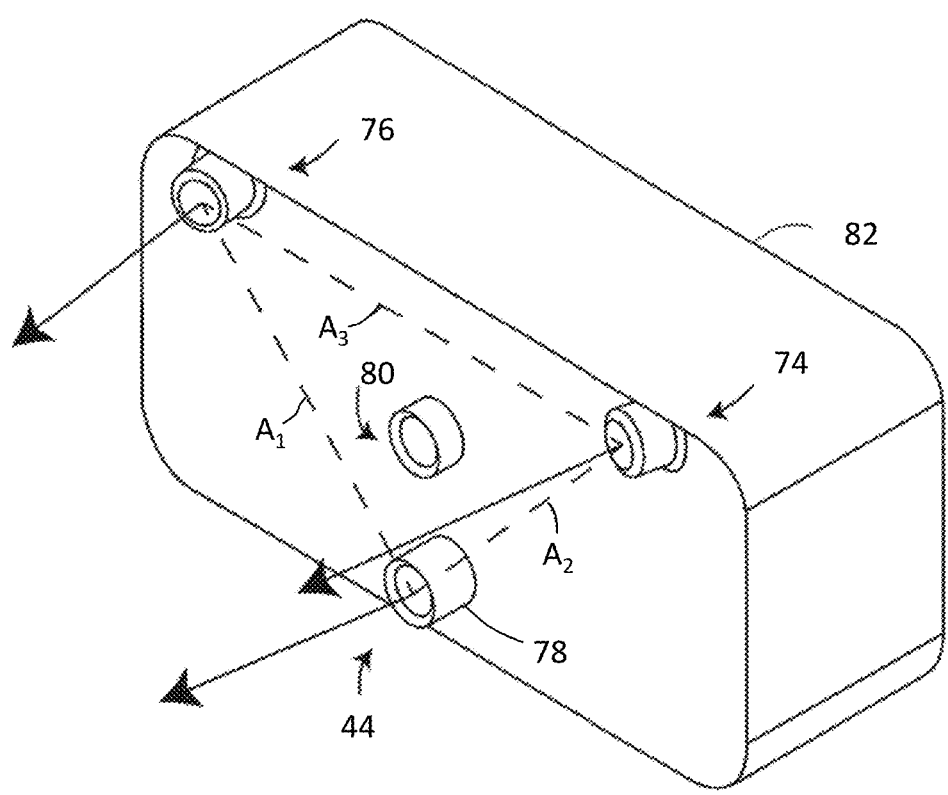
FIG. 6 shows an area triangulation scanner portion of the system of FIG. 1 in accordance with an embodiment.
FIG. 11 shows a flow diagram of a method of operating the system of FIG. 1 in accordance with an embodiment of the invention.

Referring now to FIG. 6, an embodiment of the 3D imager 44 is shown that provides for the acquisition of 3D coordinates with 6DOF. The 3D imager has two cameras 74, 76 and a projector 78 arranged in a triangle $A_1$-$A_2$-$A_3$. In an embodiment, the cameras 74, 76 and projector 78 are disposed within a housing 82 in a predetermined or fixed geometric relationship. In an embodiment, the 3D imager 44 further includes a camera 80 (sometimes referred to as a RGB camera) that may be used to provide color (texture) information for incorporation into the 3D image. In some embodiments, the camera 80 acquires a video image may be used to register multiple 3D images using videogrammetry. As used herein, the term "projector" is defined to generally refer to a device for producing a pattern. The generation of the pattern can take place by means of deflecting methods, such as generation by means of diffractive optical elements or micro-lenses (or single lasers), or by shading methods, for example the production by means of shutters, transparencies (as they would be used in a transparency projector) and other masks. The deflecting methods have the advantage of less light getting lost and consequently a higher intensity being available.

Figure 7:
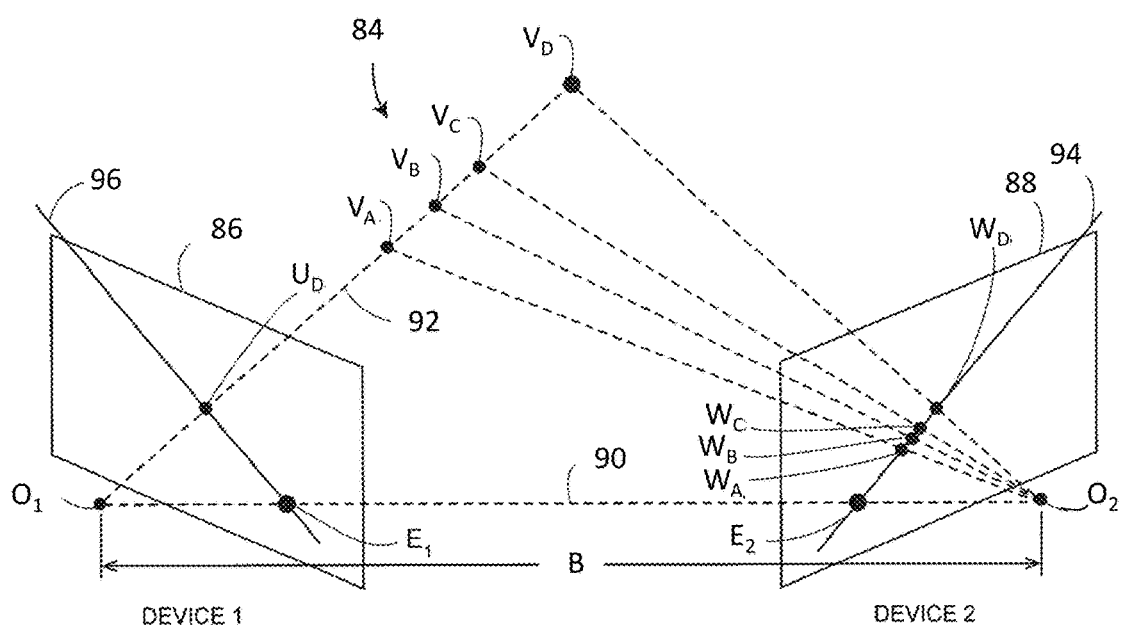
FIG. 7 and FIG. 8 are schematic illustrations of the principle of operation of the scanner of FIG. 6.

The triangular arrangement is advantageous in providing information beyond that available for two cameras and a projector arranged in a straight line or from a system with a projector and a single camera. The additional information may be understood in reference to FIG. 7, which explain the concept of epipolar constraints, and FIG. 8 that explains how epipolar constraints are advantageously applied to the triangular arrangement of the 3D imager 44. In FIG. 7, a 3D triangulation instrument 84 includes a device 1 and a device 2 on the left and right sides as view from the viewpoint of FIG. 7, respectively. Device 1 and device 2 may be two cameras or device 1 and device 2 may be one camera and one projector. Each of the two devices, whether a camera or a projector, has a perspective center, $O_1$ and $O_2$, and a representative plane, 86 or 88. The perspective centers are separated by a baseline distance B, which is the length of the line 90. The perspective centers $O_1$, $O_2$ are points through which rays of light may be considered to travel, either to or from a point on a surface in the area of the environment being scanned. These rays of light either emerge from an illuminated projector pattern or impinge on a photosensitive array. The placement of the reference planes 86, 88 is applied in FIG. 7, which shows the reference planes 86, 88 between the object point and the perspective centers $O_1$, $O_2$.

In FIG. 7, for the reference plane 86 angled toward the perspective center $O_2$ and the reference plane 88 angled toward the perspective center $O_1$, a line 90 drawn between the perspective centers $O_1$ and $O_2$ crosses the planes 86 and 88 at the epipole points $E_1$, $E_2$, respectively. Consider a point $U_D$ on the plane 86. If device 1 is a camera, it is known that an object point that produces the point $U_D$ on the image lies on the line 92. The object point might be, for example, one of the points $V_A$, $V_B$, $V_C$, or $V_D$. These four object points correspond to the points $W_A$, $W_B$, $W_C$, $W_D$, respectively, on the reference plane 88 of device 2. This is true whether device 2 is a camera or a projector. It is also true that the four points lie on a straight line 94 in the plane 88. This line, which is the line of intersection of the reference plane 88 with the plane of $O_1$-$O_2$-$U_D$, is referred to as the epipolar line 92. It follows that any epipolar line on the reference plane 88 passes through the epipole $E_2$. Just as there is an epipolar line on the reference plane of device 2 for any point on the reference plane of device 1, there is also an epipolar line 96 on the reference plane of device 1 for any point on the reference plane of device 2.

Figure 8:
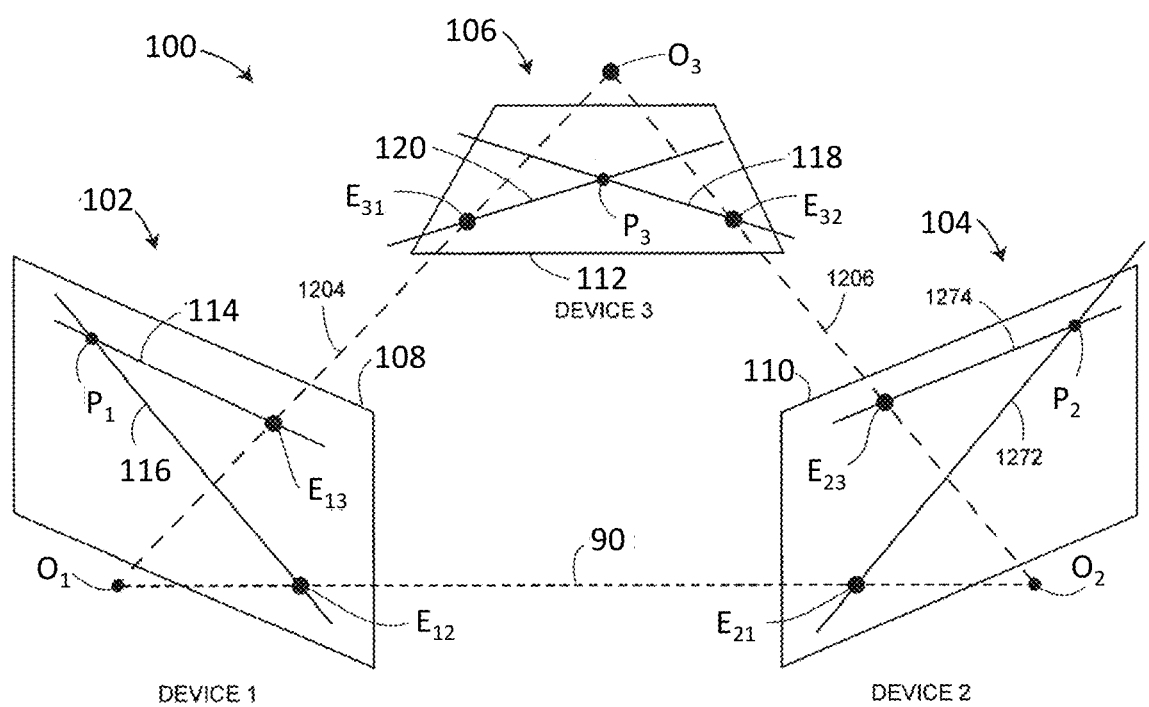

FIG. 8 illustrates the epipolar relationships for a 3D imager 100 corresponding to 3D imager 84 of FIG. 7 in which two cameras and one projector are arranged in a triangular pattern. In general, the device 1, device 2, and device 3 may be any combination of cameras and projectors as long as at least one of the devices is a camera. Each of the three devices 102, 104, 106 has a perspective center $O_1$, $O_2$, $O_3$, respectively, and a reference plane 108, 110, and 112, respectively. Each pair of devices has a pair of epipoles. Device 1 and device 2 have epipoles $E_{12}$, $E_{21}$ on the planes 108, 110, respectively. Device 1 and device 3 have epipoles $E_{13}$, $E_{31}$, respectively on the planes 108, 112, respectively. Device 2 and device 3 have epipoles $E_{23}$, $E_{32}$ on the planes 110, 112, respectively. In other words, each reference plane includes two epipoles. The reference plane for device 1 includes epipoles $E_{12}$ and $E_{13}$. The reference plane for device 2 includes epipoles $E_{21}$ and $E_{23}$. The reference plane for device 3 includes epipoles $E_{31}$ and $E_{32}$.

Consider the embodiment of FIG. 8 in which device 3 is a projector, device 1 is a first camera, and device 2 is a second camera. Suppose that a projection point $P_3$, a first image point $P_1$, and a second image point $P_2$ are obtained in a measurement. These results can be checked for consistency in the following way.

To check the consistency of the image point $P_1$, intersect the plane $P_3$-$E_{31}$-$E_{13}$ with the reference plane 1260 to obtain the epipolar line 114. Intersect the plane $P_2$-$E_{21}$-$E_{12}$ to obtain the epipolar line 116. If the image point $P_1$ has been determined consistently, the observed image point $P_1$ will lie on the intersection of the determined epipolar line 114 and line 116.

To check the consistency of the image point $P_2$, intersect the plane $P_3$-$E_{32}$-$E_{23}$ with the reference plane 1270 to obtain the epipolar line 1274. Intersect the plane $P_1$-$E_{12}$-$E_{21}$ to obtain the epipolar line 1272. If the image point $P_2$ has been determined consistently, the observed image point $P_2$ will lie on the intersection of the determined epipolar lines 1272 and 1274.

To check the consistency of the projection point $P_3$, intersect the plane $P_2$-$E_{23}$-$E_{32}$ with the reference plane 110 to obtain the epipolar line 118. Intersect the plane $P_1$-$E_{13}$-$E_{31}$ to obtain the epipolar line 120. If the projection point $P_3$ has been determined consistently, the projection point $P_3$ will lie on the intersection of the determined epipolar line 118 and line 1284.

The redundancy of information provided by using a 3D imager 100 having a triangular arrangement of projector and cameras may be used to reduce measurement time, to identify errors, and to automatically update compensation/calibration parameters.

Figure 9:
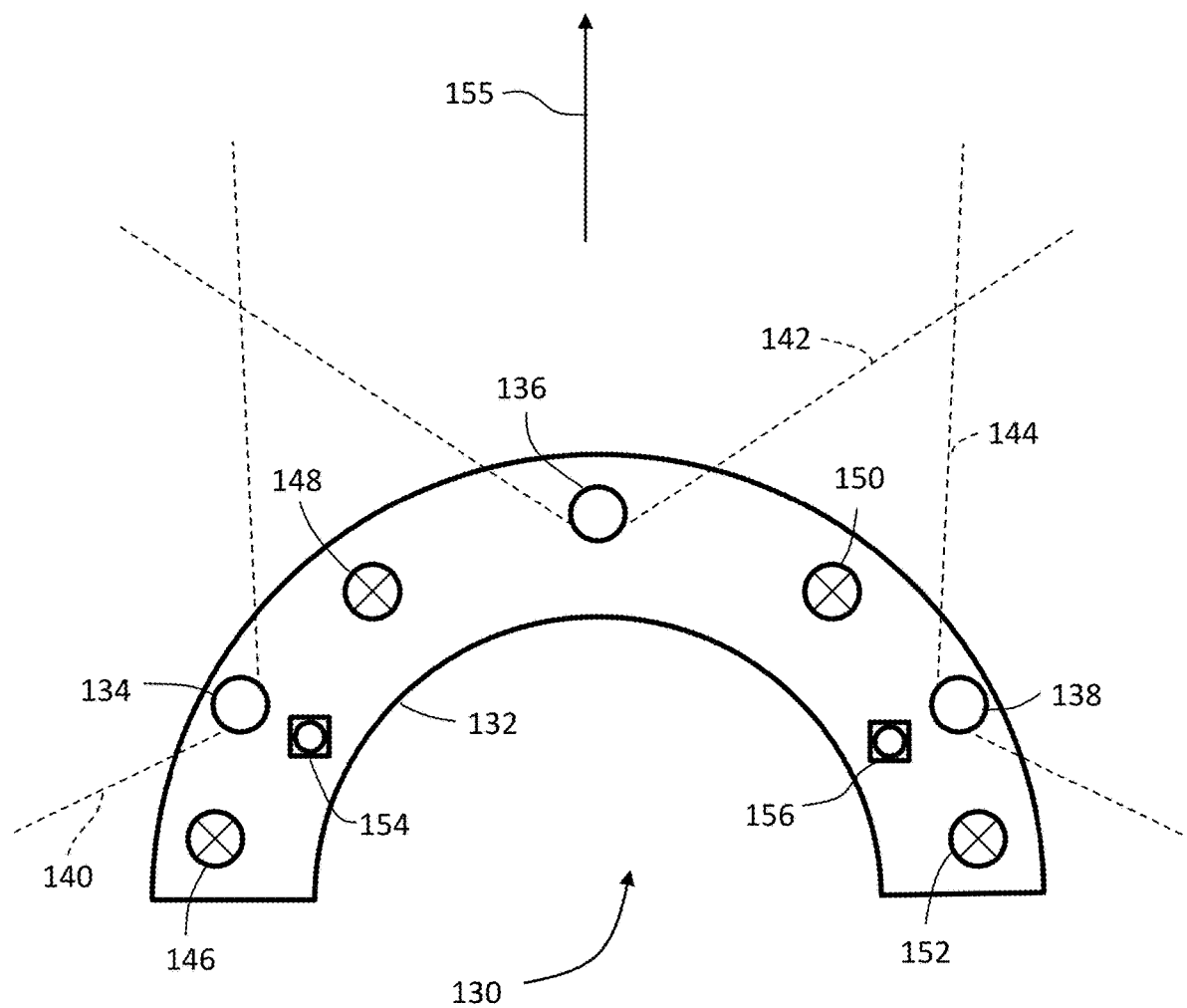
FIG. 9 shows a schematic top view of an 3D imager for use with the system of FIG. 1 in accordance with another embodiment of the invention.

It should be appreciated that while the embodiments of FIGS. 1-8 illustrate the 3D Imager 44 as pointing in the direction of travel, this is for exemplary purposes and in other embodiments such as that shown in FIG. 9, a 3D imager 130 may be used to provide for scanning over a larger area. In this embodiment, a housing 132 is provided that holds the cameras and projectors to the mobile platform 22. Coupled to the housing 132 are a plurality of cameras 134, 136, 138, sometimes referred to as RGB cameras, that are used to acquire images of the area of the environment being scanned. In one embodiment, the cameras 134, 136, 138 operate in the same manner as camera 80 described herein above. Each of the cameras 134, 136, 138 has a field of view 140, 142, 144 respectively. In an embodiment, the adjacent fields of view 140, 142 and fields of view 142, 144 overlap to provide for a composite field of view for the imager 130 that is over 180 degrees. It should be appreciated that this may provide advantages in scanning areas where the natural features that may be used for registration are spread apart from each other. Thus, in an embodiment, the video image acquired by cameras 134, 136, 138 may be used in the registration of 3D coordinate data.

Also coupled to the housing 132 are a plurality of infrared cameras 146, 148, 150, 152 that are operable to acquire images of infrared wavelength light. The infrared cameras 146, 148, 150, 152 each have a field of view. In an embodiment, the field of view of infrared cameras 146, 148 at least partially overlap and the field of view of infrared cameras 150, 152 at least partially overlap. It should be appreciated that by partially overlapping the field of view of the infrared cameras allows, at least in some instances, for the images recorded by infrared cameras 146, 148 to be registered to each other based on natural features in the area of the environment being scanned. Similarly, the partial overlap of the field of view of infrared cameras 150, 152 allows the acquired images to be registered to each other.

In an embodiment, projectors 154, 156, emit the infrared light acquired by infrared cameras 146, 148, 150, 152. The projectors 154, 156 are operable to project a pattern of light into the area covered by the field of view of the infrared cameras 146, 148, 150, 152. The pattern of light emitted by projector 154 is acquired by infrared cameras 146, 148 to form a first 3D imaging device. The pattern of light emitted by projector 156 is acquired by infrared cameras 150, 152 to form a second 3D imaging device. It should be appreciated that the first 3D imaging device and the second 3D imaging device operate in a similar manner to that described above with respect to FIG. 6 and FIG. 8. In some embodiments, the 3D imager 130 provides advantages in allowing for the acquisition of 3D coordinate data to the sides of the indoor mapping system 20 when the system 20 is moved in the direction indicated by arrow 155. In still further embodiments, the 3D imager 130 provides advantages in allowing 3D coordinate data to be acquired over a larger area.

Figure 10:
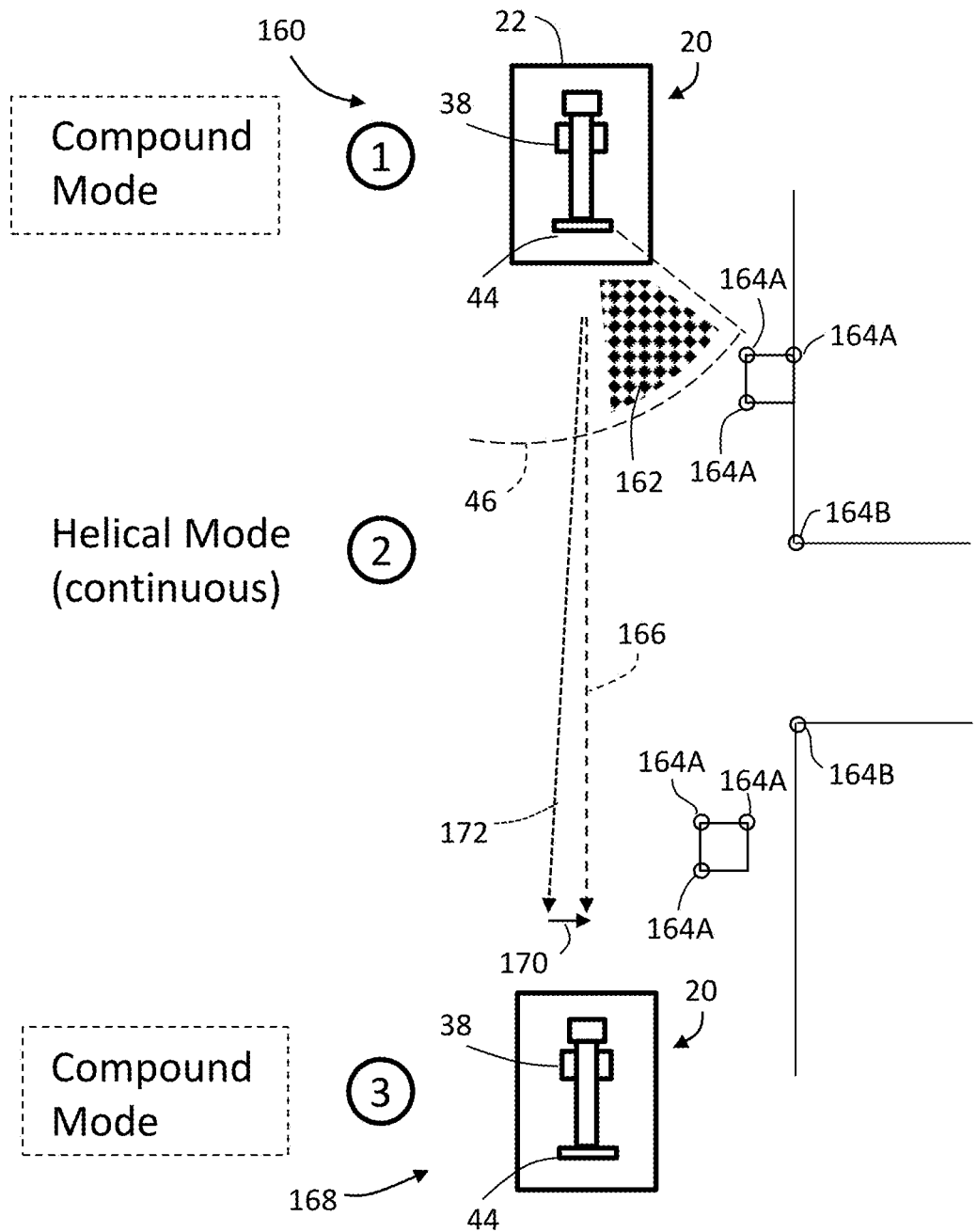
FIG. 10 shows a schematic representation of the operation of the system of FIG. 1 in accordance with an embodiment of the invention.
Figure 11:
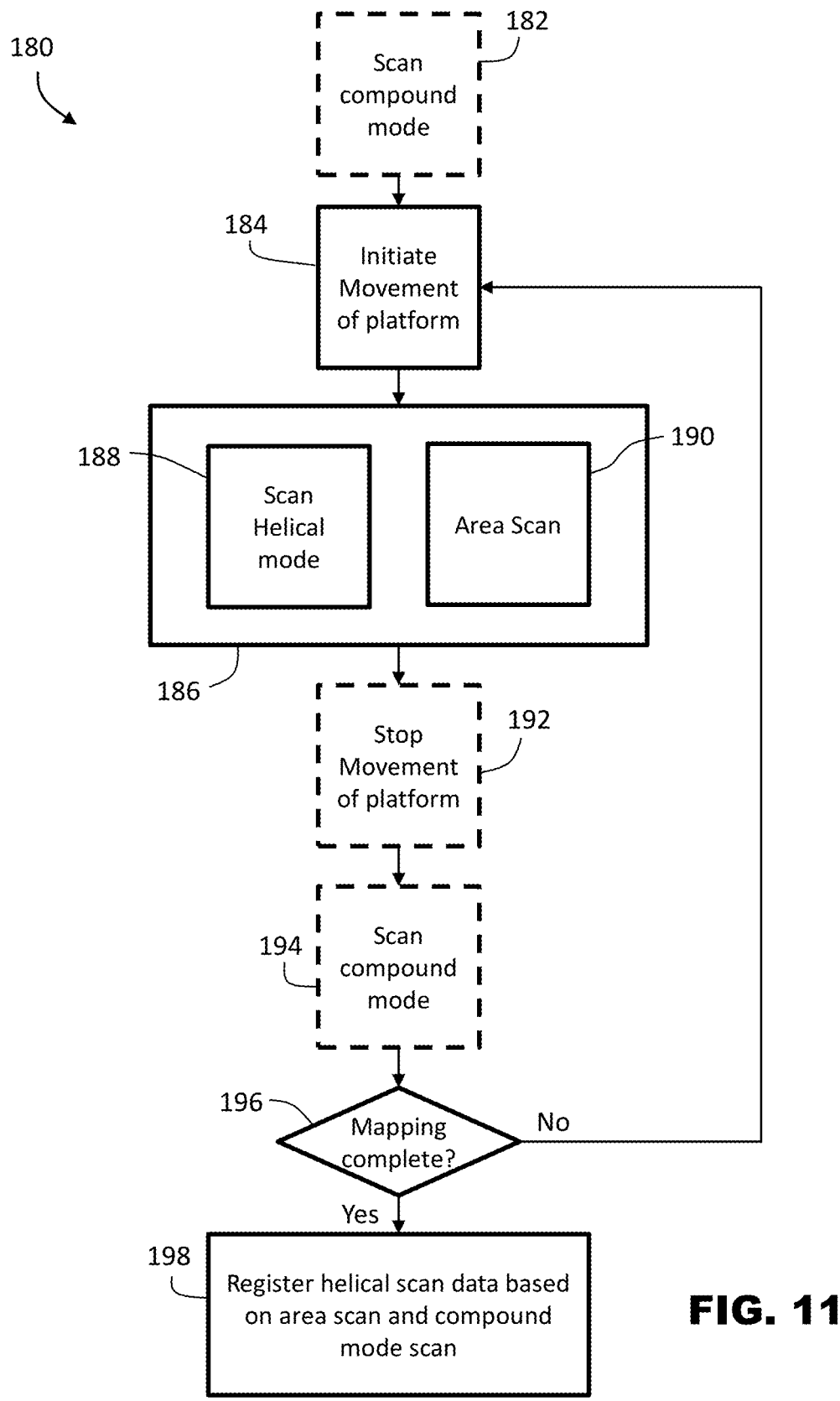

In operation, the indoor mapping system 20 may have three modes of operation to acquire data as shown in FIG. 10. The system 20 starts with a first mode at a first position 160. In one embodiment, the laser scanner 38 initially performs an optional compound scan. Once the laser scanner 38 completes this first compound scan, 3D coordinate data is acquired for the area of the environment around the first position 160. In an embodiment, the 3D coordinate data acquired at the first position 160 defines a third group of 3D coordinate data. The operator then initiates movement of the mobile platform 22. In an embodiment, the 3D imager 44 acquires 3D coordinate data by projecting a pattern of light 162 in the area 46 (FIG. 3). In another embodiment, the 3D imager 44 initiates operation and acquisition of 3D coordinates when the mobile platform 22 starts to move.

As the 3D imager 44 acquires 3D coordinate data, natural features such as corners of structures 164A or intersections of walls 164B may be identified and form fiducial points that are later used to register the 3D coordinate data acquired by the laser scanner 38. It should be appreciated that the group of 3D coordinate data acquired by the 3D imager 44 allows the determination of the position and orientation of the mobile platform 22 with six degrees of freedom. As will be discussed in more detail herein, this also allows the determination of the position and orientation of the laser scanner 38 with six degrees of freedom when the laser scanner 38 is acquiring 3D coordinate data in a helical mode. As a result, advantages are gained in improving the registration of the 3D coordinate data acquired by the laser scanner in embodiments, such as where the floor is not perfectly level or where the mobile platform 22 may roll over an object or debris.

As the system 20 is moved, the laser scanner 38 changes to a second mode of operation where laser scanner 38 is operated in a helical mode (e.g., 3D coordinate data is acquired in plane 42, FIG. 3). The laser scanner 38 operates in helical mode as the mobile platform 22 is moved along path 166. In an embodiment, the 3D coordinate data acquired with the laser scanner 38 in helical mode defines a second group of 3D coordinate data. Similarly, the 3D imager 44 is also operated continuously as the mobile platform 22 is moved along path to acquire 3D coordinate data in the area 46 and identify natural features 164A, 164B. In an embodiment, the 3D coordinate data acquired by the 3D imager along the path 166 defines a third group of 3D coordinate data.

In one embodiment, rather than scanning in a helical mode, the laser scanner 38 scans in a compound mode while the mobile platform 22 is moved. In an embodiment, to maintain a desired mobile platform speed, the laser scanner 38 is rotated about axis 52 at a rate greater than or equal to 1 Hz. In an embodiment, the rotation of the laser scanner 38 about the axis 52 is configured such that when multiple rotations of the laser scanner occur while scanning in compound mode, each rotation of the laser scanner 38 about axis 52 will measure different points within the environment. In other words, the point measured at a particular angular orientation about the axis 52 and mirror angular position about axis 56 will be different in the second rotation than in the first rotation. It should be appreciated that this changing of position will also occur for each subsequent rotation of the laser scanner 38.

It should be appreciated that when scanning in the compound mode, the laser scanner 38 is also measuring the mobile platform 22. In an embodiment, the 3D coordinate data points of the mobile platform 22 may be removed from the group of 3D coordinate date (e.g. removed from the point cloud). In an embodiment, the laser scanner 38 may have defined windows where measured data is ignored (e.g. the area where the mobile platform is located).

When the system 20 reaches a second position 168, the system 20 enters a third mode of operation where the laser scanner 38 once again performs a compound scan of the area of the environment around the second position 168. In an embodiment, this second compound scan by the laser scanner 38 defines a fourth group of 3D coordinate data. It should be appreciated that the 3D coordinate data acquired by the laser scanner 38 (e.g. the first, second and fourth groups of 3D coordinate data) may be registered based at least in part on the 3D coordinate data (e.g. the third group of 3D coordinate data) acquired and the natural features 164A, 164B identified by the scans performed by the 3D imager 44. In another embodiment, the 3D coordinate data acquired by the laser scanner 38 in compound mode (e.g. at position 168) may correct for drift 170 that results when the actual path 166 and the measured path 172 deviate due to measurement error, as may happen in systems that rely on inertial measurement units (e.g. gyroscopes and accelerometers). In one embodiment, the drift 170 may be correct using loop-closure methods and intermediate scans (positions where the mobile platform is not moving a predetermined period of time, e.g. >15 seconds).

It should be appreciated that while the illustrated embodiment of FIG. 10 shows the path 166 as being straight, this is for exemplary purposes and the claimed invention should not be so limited. In other embodiments, the operator may move the mobile platform along a nonlinear or curved pathway.

Referring now to FIG. 11, a method 180 is shown for operating the indoor mapping system 20. The method 180 starts in block 182 with an optional compound scan with the laser scanner 38. Once the compound scan is completed, the movement of the mobile platform 22 is initiated in block 184. In one embodiment, the mobile platform 22 is moved based on an action by the operator (e.g. pushing on handle 26) or may occur automatically (e.g. motors coupled to wheels 24 engage once the compound scan is completed).

The method 180 then proceeds to block 186 where the laser scanner 38 performs the helical scan and the area scan is performed by 3D imager 44 in block 190. It should be appreciated that the operations in blocks 188, 190 may be performed simultaneously. In an embodiment, the operations of block 186 are performed continuously while the mobile platform 22 is moved. The method then proceeds to block 192 where the movement of the mobile platform 22 is stopped. In block 194, laser scanner 38 performs a second compound scan. In an embodiment, the distance the mobile platform 22 is moved (e.g. along path 166) may be predetermined (e.g. 30 meters) wherein the mobile platform 22 is optionally automatically stopped in block 192. In one embodiment, the compound scan of block 194 is performed automatically when the mobile platform 22 is stopped for a predetermined amount of time, such as 15 seconds for example.

The method 194 may then proceed to query block 196 where it is optionally determined whether the area of the environment that the operator wanted to scan is complete. When the query block 196 returns a negative (i.e. the operator desires to scan more areas of the environment), the method 180 loops back to block 184. In one embodiment, the second compound scan by laser scanner 38 in block 194 is used as the first compound scan for the next scanning iteration. In another embodiment, the method 180 loops back to block 182 to acquire another compound scan by the laser scanner 38 at the start of the next scanning iteration.

The scanning iterations continues until the query block 196 returns a negative. Thereupon the method 180 proceeds to block 198 to registers the 3D coordinate data acquired by laser scanner 38 (e.g. the first, second and fourth groups of 3D coordinate data) based at least in part on the 3D coordinate data (e.g. the third group of 3D coordinate data) and natural features identified by the operation of the 3D imager 44.

It should be appreciated that in other embodiments, the registration of the 3D coordinate data acquired by the laser scanner 38 may be registered after each iteration (e.g. when the query block 196 returns a negative) or may be continuously registered.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A system for optically scanning and measuring an area of an environment comprising:
   a first three-dimensional (3D) measurement device being operable to determine a distance to a surface in the area based at least in part on the speed of light;
   a second measurement device operably coupled in a fixed relationship to the first 3D measurement device, the second measurement device being operable to determine a position of the second measurement device based on one or more points on the surface in the area based at least in part on a projected light;
   a memory having non-transitory computer readable instructions; and
   one or more processors for executing the computer readable instructions, the one or more processors being operably coupled to the first 3D measurement device and the second measurement device, the computer readable instructions comprising:
      acquiring a first group of 3D coordinates of the area with the first 3D measurement device operating while moving the first 3D measurement device through the environment;
      acquiring a second group of coordinates of at least a portion of the area with the second measurement device while the first 3D measurement device is moved through the environment; and
      registering the first group of 3D coordinates based at least in part the second group of coordinates.

2. The system of claim 1, wherein the first group of 3D coordinates and the second group of coordinates are acquired simultaneously.

3. The system of claim 1, further comprising a mobile platform, the first 3D measurement device and second measurement device being coupled to the mobile platform.

4. The system of claim 3, wherein the mobile platform includes one or more wheels.

5. The system of claim 1, wherein the second measurement device includes a camera.

6. The system of claim 5, wherein the computer readable instructions further comprise acquiring a plurality of images with the camera, and wherein the registering of the first group of 3D coordinates is further based at least in part on the plurality of images.

7. The system of claim 1, wherein the computer readable instructions for acquiring the acquiring a first group of 3D coordinates includes operating the first 3D measurement device in a compound mode of operation.

8. A system for optically scanning and measuring an area of an environment comprising:
   a first three-dimensional (3D) measurement device being operable to determine a distance to a surface in the area based at least in part on the speed of light;
   a second measurement device operably coupled in a fixed relationship to the first 3D measurement device, the second measurement device being operable to determine a position of the second measurement device based on one or more points on the surface in the area based at least in part on a projected light;
   a memory having non-transitory computer readable instructions; and
   one or more processors for executing the computer readable instructions, the one or more processors being operably coupled to the first 3D measurement device and the second measurement device, the computer readable instructions comprising:
   acquiring a first group of 3D coordinates of the area with the first 3D measurement device operating while moving the first 3D measurement device through the environment;
   acquiring a second group of coordinates of at least a portion of the area with the second measurement device while the first 3D measurement device is moved through the environment;
   registering the first group of 3D coordinates based at least in part the second group of coordinates; and
   wherein the computer readable instructions further comprise determining the position and orientation of the second measurement device.

9. A method for optically scanning and measuring an area of an environment comprising:
   acquiring a first group of 3D coordinates of the area with a first 3D measurement device operating while moving the first 3D measurement device through the environment, the first three-dimensional (3D) measurement device being operable to determine a distance to a surface in the area based at least in part on the speed of light;
   acquiring a second group of coordinates of at least a portion of the area with a second measurement device while the first 3D measurement device is moved through the environment, the second measurement device being operably coupled in a fixed relationship to the first 3D measurement device, the second measurement device being operable to determine a position of the second measurement device based on one or more points on the surface in the area based at least in part on a projected light; and
   registering the first group of 3D coordinates based at least in part the second group of coordinates.

10. The method of claim 9, further comprising simultaneously acquiring the first group of 3D coordinates and the second group of coordinates.

11. The method of claim 9, wherein the first 3D measurement device and the second measurement device are mounted to a movable platform.

12. A method for optically scanning and measuring an area of an environment comprising:
   acquiring a first group of 3D coordinates of the area with a first 3D measurement device operating while moving the first 3D measurement device through the environment, the first three-dimensional (3D) measurement device being operable to determine a distance to a surface in the area based at least in part on the speed of light;
   acquiring a second group of coordinates of at least a portion of the area with a second measurement device while the first 3D measurement device is moved through the environment, the second measurement device being operably coupled in a fixed relationship to the first 3D measurement device, the second measurement device being operable to determine a position of the second measurement device based on one or more points on the surface in the area based at least in part on a projected light;
   registering the first group of 3D coordinates based at least in part the second group of coordinates;
   simultaneously acquiring the first group of 3D coordinates and the second group of coordinates; and
   determining the position and orientation of the second measurement device.

13. The method of claim 12, further comprising acquiring a plurality of images with the camera, and wherein the registering of the first group of 3D coordinates is further based at least in part on the plurality of images.

14. The method of claim 13, wherein the second measurement device includes a camera.

15. The method of claim 14, further comprising acquiring a plurality of images with the camera, and wherein the registering of the first group of 3D coordinates is further based at least in part on the plurality of images.

16. The method of claim 15, further comprising acquiring a first group of 3D coordinates includes operating the first 3D measurement device in a compound mode of operation.

* * * * *